(12) United States Patent
Dey

(10) Patent No.: US 9,753,857 B2
(45) Date of Patent: *Sep. 5, 2017

(54) TWO HANDED INSERTION AND DELETION ALGORITHM FOR CIRCULAR BUFFER

(71) Applicant: International Business Machines Corporation, Armonk, NY (US)

(72) Inventor: Swapan Dey, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/857,974

(22) Filed: Sep. 18, 2015

(65) Prior Publication Data

US 2016/0004645 A1    Jan. 7, 2016

Related U.S. Application Data

(63) Continuation of application No. 13/925,884, filed on Jun. 25, 2013, now Pat. No. 9,170,944.

(51) Int. Cl.
*G06F 12/08* (2016.01)
*G06F 12/12* (2016.01)
*G06F 12/0891* (2016.01)
*G06F 12/0808* (2016.01)
*G06F 12/122* (2016.01)

(52) U.S. Cl.
CPC ...... *G06F 12/0891* (2013.01); *G06F 12/0808* (2013.01); *G06F 12/12* (2013.01); *G06F 12/122* (2013.01); *G06F 2212/604* (2013.01); *G06F 2212/69* (2013.01)

(58) Field of Classification Search
None
See application file for complete search history.

(56) References Cited

U.S. PATENT DOCUMENTS 4,814,746 A    3/1989  Miller et al.
5,125,083 A *  6/1992  Fite ...................... G06F 9/3816
                                                    712/207
6,467,025 B1   10/2002 Taylor
(Continued)

OTHER PUBLICATIONS

Bansal et al., "CAR: Clock with Adaptive Replacement".
(Continued)

*Primary Examiner* — Denise Tran
(74) *Attorney, Agent, or Firm* — Isaac J. Gooshaw

(57) ABSTRACT

Exemplary embodiments of the present invention disclose a method, program product, and system for selecting an item to evict and an insertion location for a new item in a circular buffer. A computer moves, in a circular buffer, in the same direction both of i) an insertion pointer to a first buffer entry, and ii) an eviction pointer to a second buffer entry that includes an item. A constant number of buffer entries is maintained between the eviction pointer and the insertion pointer. The computer responds to an eviction of the item from the second buffer entry by inserting a new item into a third buffer entry. The third buffer entry is located such that the third buffer entry is pointed to by the eviction pointer before being pointed to by the insertion pointer, as the eviction pointer and the insertion pointer continue to move around the circular buffer.

20 Claims, 5 Drawing Sheets

(56) References Cited

U.S. PATENT DOCUMENTS

| | | | |
|---|---|---|---|
| 6,996,676 | B2 | 2/2006 | Megiddo et al. |
| 8,255,630 | B1 | 8/2012 | Bali et al. |
| 9,170,944 | B2 * | 10/2015 | Dey .................. G06F 12/0808 |
| 2003/0163630 | A1 * | 8/2003 | Aasheim ............ G06F 12/0246 711/103 |
| 2006/0069876 | A1 | 3/2006 | Bansal et al. |
| 2007/0005901 | A1 | 1/2007 | Kellar |
| 2011/0191522 | A1 | 8/2011 | Condict et al. |
| 2014/0365734 | A1 | 12/2014 | Bridge, Jr. et al. |
| 2014/0379992 | A1 | 12/2014 | Dey |

OTHER PUBLICATIONS

"Cache algorithms", <http://en.wikipedia.org/wiki/Cache_algorithms#Least_Recently_Used>.

Effelsberg et al., "Principles of Database Buffer Management", Copyright 1984 ACM 0730-0301/84/1200-0560, ACM Transaction on Database Systems, vol. 9, No. 4, Dec. 1984, pp. 560-595.

Jiang, "CLOCK-Pro: An Effective Improvement of the CLOCK Replacement", USENIX Association 2005 USENIX Annual Technical Conference, pp. 323-336.

Johnson, "2Q: A Low Overhead High Performance Buffer Management Replacement Algorithm", Proceedings of the 20th VLDB Conference Santiago, Chile, 1994, pp. 439-450.

McDougall et al.,"SolarisT Internals. Solaris 10 and OpenSolaris Kernel Architecture", Section 10.3. The Page Scanner, <http://flylib.com/books/en/2.830.1.120/1/>.

Nicola et al., "Analysis of the Generalized Clock Buffer Replacement Scheme for Database Transaction Processing", 1992 ACM SIGMETRICS & Performance '92-6/92/R.I., USA, Copyright 1992 ACM 0-89791-508-9/92/0005/0035, Performance Evaluation Review, vol. 20, No. 1, Jun. 1992, pp. 35-46.

O'Neil et al., The LRU-K Page Replacement Algorithm for Database Disk Buffering, SIGMOD/5/93/Washington, DC, USA, Copyright 1993 ACM 0-89791-592-5/93/0005/0297, pp. 297-306.

"Page replacement algorithm", <http://en.wikipedia.org/wiki/Page_replacement_algorithm#Clock>.

"Replacement Algorithms Handout", Copyright M C Paull 2005, pp. 1-19, Lecture Notes-4c Chapter 4—Memory Management Paging-Replacement Algs on Nov. 2007 at Rutgers University: 198:416—Operating Systems Design—Fall 2007 Sections: 1, 2 Lecture Notes, <http://www.cs.rutgers.edu/~paull/classnotes.html>, <http://www.cs.rutgers.edu/~paull/OS_MMNG3_REPL.pdf>.

Rohm, "INFO3404/3504—Database Systems II", INFO3404/3504 "Database Systems II"—2012 (U. Röhm), pp. 2-2-2-47.

Smith, "Sequentiality and Prefetching in Database Systems", ACM Transactions on Database Systems, vol. 3, Sep. 1978, pp. 223-247.

Zivkov, "Disk Caching in Large Databases and Timeshared Systems", Sep. 1996, pp. 1-10.

Yui et al., "Nb-GCLOCK: A Non-blocking Buffer Management Based on the Generalized CLOCK", 12 pages, provided on the search report dated Jan. 24, 2013.

"Methods for Coarse-Grained Cache Utility Profiling in CLOCK Using Valueless Keys", Authors et al.: Disclosed Anonymously, IP.com No. IPCOM000208668D, IP.com Electronic Publication: Jul. 14, 2011, pp. 1-10, copyright © IP.com, <www.ip.com>.

* cited by examiner

When item X is referenced
401 — If X is in buffer and access_count of X < access_count_limit then
        access_count = access_count + 1
402 — else if X is not in buffer and buffer is not full then
        insert (X) / /insert immediately counterclockwise to insertion_ptr
403 — else / / X is not in buffer and buffer is full 404 — loop
    read access_count of item pointed to by eviction_ptr
    if access_count = 0 then
        exit loop
    end if
    access_count = access_count-1
    eviction_ptr = eviction_ptr.next / /point eviction_ptr to next item
    insertion_ptr = insertion_ptr.next / /point insertion_ptr to next item
end loop 405 — evict item pointed to by eviction_ptr
    eviction_ptr = eviction_ptr.next / /point eviction_ptr to next item
    insert(X) / /insert immediately counterclockwise to insertion_ptr
end if

FIG. 4

TWO HANDED INSERTION AND DELETION ALGORITHM FOR CIRCULAR BUFFER

FIELD OF THE INVENTION

The present invention relates generally to cache replacement algorithms and more specifically to algorithms for selecting an item to delete and a location for a new item in a circular buffer.

BACKGROUND

Buffers and caches are often used in computing systems to temporarily hold items that are frequently accessed or whose access time may otherwise inhibit performance. Since buffers and caches have limited size, techniques used to efficiently utilize their limited space strongly influence their performance. One type of buffer is a circular buffer implemented in software. A circular buffer is a list of items linked in a circular fashion. Each item in the list is linked to a previous item and a next item, where the first item in the list is the next item with respect to the last item on the list, i.e., the items are linked in a circle. Two algorithms are necessary to operate such a buffer: first, an algorithm to select an item to delete when a new item is to be inserted into a full buffer; second, an algorithm to select a location for the new item. A location from which an item is deleted to make space for a new item and a location to which the new item is inserted may not be the same location. This happens more often in software implemented buffers than those implemented in hardware. The logic that selects these locations is embodied in a replacement algorithm which has a profound effect on the performance of a buffer under various workloads. The performance of a buffer is usually measured by its hit rate, the fraction of accesses to a buffer that find an accessed item in the buffer. The performance of a given replacement algorithm will vary under different circumstances and depends strongly on the access pattern of a program using a buffer.

A common replacement algorithm used with a buffer or a cache is least recently used or LRU. When a new item must be added to a full buffer, the LRU algorithm evicts an item from the buffer or a section of the buffer that has not been accessed for the longest period of time compared to that of other items under consideration and the new item replaces the evicted item. Unfortunately, in some buffer configurations and for large buffers, the logic necessary to keep track of a LRU item and the next LRU item, etc. can be significant.

SUMMARY

Exemplary embodiments of the present invention disclose a method, program product, and system for selecting an item to evict and a location for a new item in a circular buffer with a maximum size. A processor moves, in a circular buffer, in the same direction both of i) an insertion pointer to a first buffer entry, and ii) an eviction pointer to a second buffer entry that includes a first item, such that a constant number of buffer entries is maintained between the eviction pointer and the insertion pointer. The processor responds to an eviction of the first item from the second buffer entry, by inserting, in the circular buffer, a new item into a third buffer entry that is located such that the third buffer entry is pointed to by the eviction pointer before being pointed to by the insertion pointer as the eviction pointer and the insertion pointer continue to move around the circular buffer.

BRIEF DESCRIPTION OF THE SEVERAL VIEWS OF THE DRAWINGS

FIG. 4 depicts pseudo code that implements a replacement algorithm depicted in FIG. 3, in accordance with an embodiment of the present invention.

DETAILED DESCRIPTION

Figure 1:
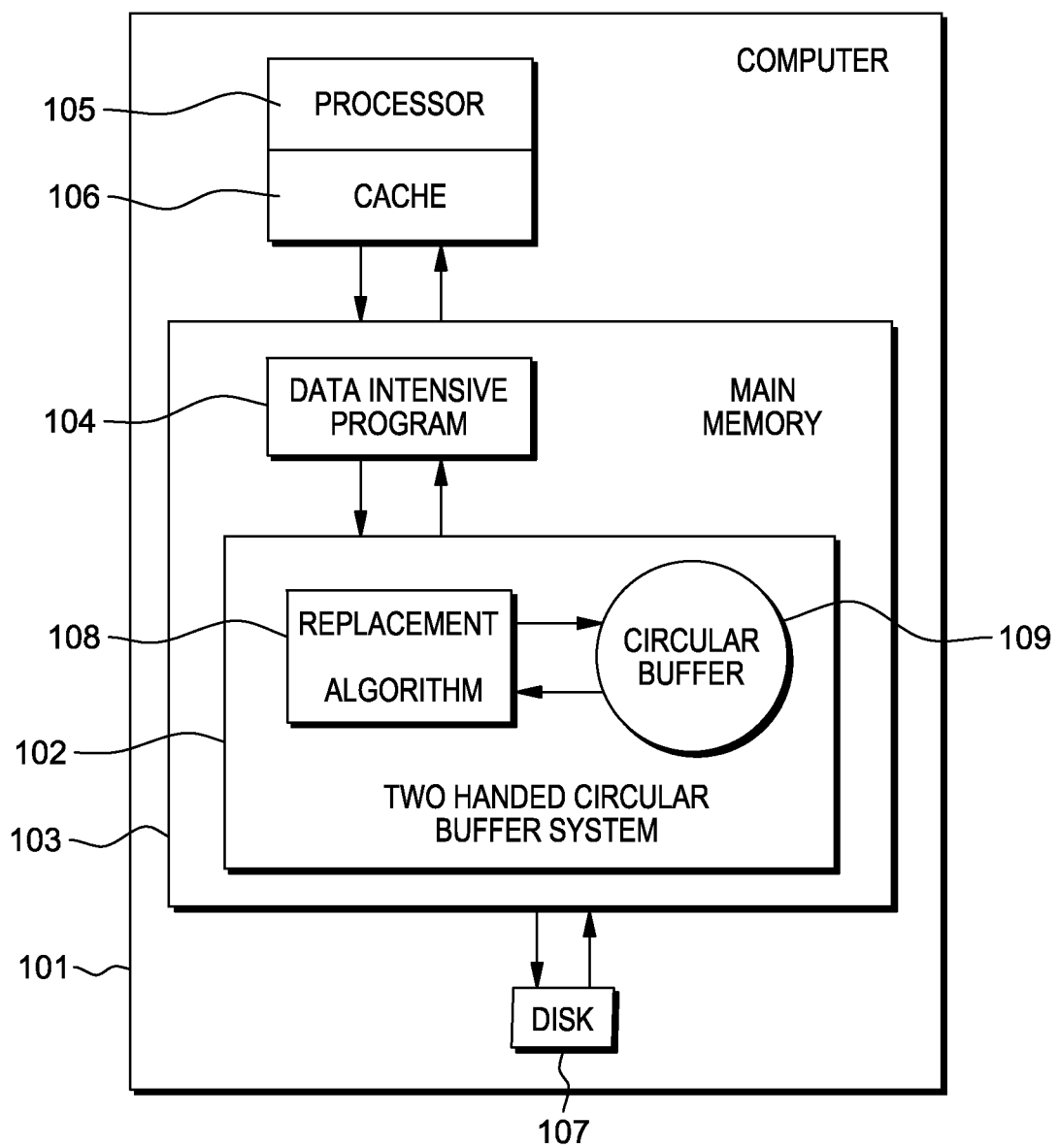
FIG. 1 is a block diagram of a computer executing a data intensive program that utilizes a two handed circular buffer system, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating the operation of a computer executing a data intensive program utilizing a two handed circular buffer system, in accordance with an embodiment of the present invention.

In various embodiments of the present invention, computer 101 is computing device that can be a standalone device, a server, a laptop computer, a tablet computer, a netbook computer, a personal computer (PC), or a desktop computer. In another embodiment, computer 101 represents a computing system utilizing clustered computers and components to act as a single pool of seamless resources. In general, computer 101 can be any computing device or a combination of devices capable of running data intensive program 104. A data intensive program is a program that accesses a large amount of data during an execution of the program. Computer 101 may include internal and external hardware components, as depicted and described in further detail with respect to FIG. 5.

In an exemplary embodiment shown in FIG. 1, two handed circular buffer system 102 in main memory 103 of computer 101 organizes and buffers data accessed by data intensive program 104. Two handed circular buffer system 102 is termed "two handed" because two pointers (two hands) are used to specify a location for an insertion and a deletion of an item during an operation of two handed circular buffer system 102. Processor 105 and cache 106 fetch data and instructions from main memory 103 to execute data intensive program 104. Data and instructions not currently in cache 106 or in main memory 103 are fetched from disk 107. Two handed circular buffer system 102 includes circular buffer 109 and replacement algorithm 108. If an item, which includes one or more datums, is needed by data intensive program 104 and the item is not in two handed circular buffer system 102, replacement algorithm 108 inserts the item into circular buffer 109. If circular buffer 109 is full, and a new item is to be inserted, replacement algorithm 108 selects an item to delete, deletes the item selected, selects a location to insert the new item and inserts the new item. If circular buffer 109 is not full, and a new item is to be inserted, the new item is inserted and no item is deleted.

Figure 2:
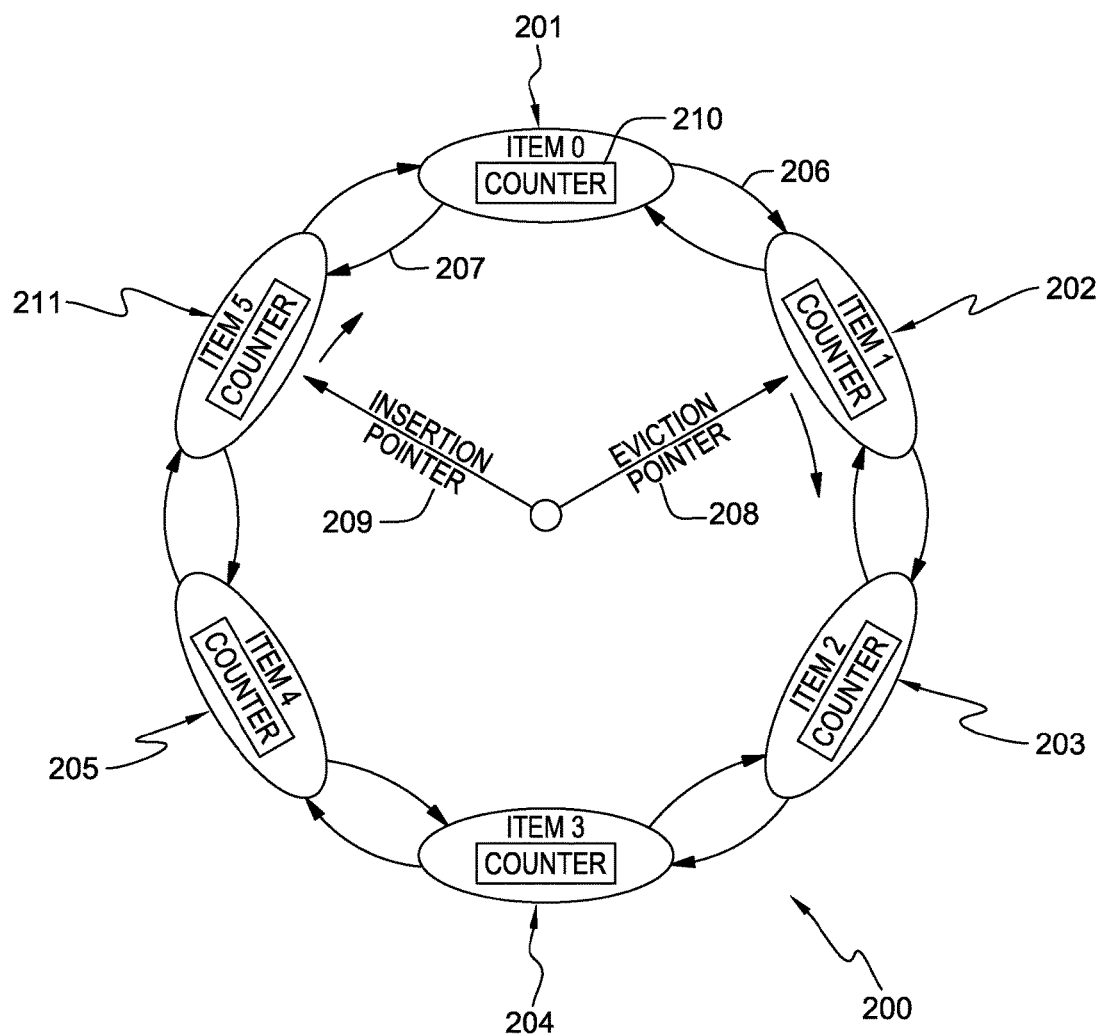
FIG. 2 depicts an example of a two handed circular buffer, in accordance with an embodiment of the present invention.

FIG. 2 shows circular buffer 200 which is an example of circular buffer 109 shown in more detail. Circular buffer 200 contains six items, items 201, 202, 203, 204, 205, and 206. An item in circular buffer 200 contains a counter that counts a number of accesses to the item. A magnitude of a count in a counter is called an access count. Replacement algorithm 108 specifies a value of an access count limit for data intensive program 104. A value for the access count limit for data intensive program 104 that results in a best hit ratio for circular buffer 200 is determined through experimentation. If an item in circular buffer 200 is accessed, an access count for the item is incremented by one if the access count is less than the value of the access count limit. For example, if the access count limit is 10 and the count for the item is 7, the access count is incremented by 1 and the access count becomes 8. If the access count limit is 10 and the count for the item is 10 the count for the item is not incremented and the count for the item remains at 10.

Each item in circular buffer 200 contains two pointers that emanate from the item. Exemplary embodiments include a next pointer that emanates from each item and points to the next item in a clockwise direction with respect to circular buffer 200. Exemplary embodiments include a previous pointer that emanates from each item and points to the previous item in a counterclockwise direction with respect to circular buffer 200. Next pointer 206 emanates from item 201 and points to an adjacent next item, item 202, in a clockwise direction with respect to circular buffer 109. Previous pointer 207 emanates from item 201 and points to an adjacent previous item, item 211, in a counterclockwise direction with respect to circular buffer 200.

Replacement algorithm 108 controls two pointers, eviction point 208 and insertion pointer 209, whose tails are located in FIG. 2 at an approximate center of a ring composed of all the items in circular buffer 200, and whose heads can move clockwise around the perimeter of circular buffer 200 as hands on a clock move. One pointer, insertion pointer 209, controls an insertion point used to locate a new item that is to be inserted into circular buffer 200. Another pointer, eviction pointer 208, is used to search for an item to be evicted when circular buffer 200 is full and a new item is to be inserted into circular buffer 200.

When data intensive program 104 begins execution, circular buffer 200 is initially empty. As data intensive program 104 executes, items are inserted into circular buffer 200 one at a time until the number of items in circular buffer 200 reaches a maximum size that is specified by replacement algorithm 108. Until circular buffer 200 is full, insertion pointer 209 exists and eviction pointer 208 does not exist. When circular buffer 200 becomes full, eviction pointer 208 is created by replacement algorithm 108 and initially points at an item in circular buffer 200 that is a constant clockwise distance from insertion pointer 209. The constant clockwise distance is specified by replacement algorithm 108. For example, in FIG. 2, replacement algorithm sets the constant clockwise distance to 2 items in circular buffer 200.

If a new item is to be inserted into circular buffer 200 and circular buffer 200 is not full, the new item is inserted counterclockwise and adjacent to an item pointed to by insertion pointer 209. For example, in FIG. 2 the insertion pointer points to item 206, and a new item is inserted between item 205 and item 206.

Figure 3:
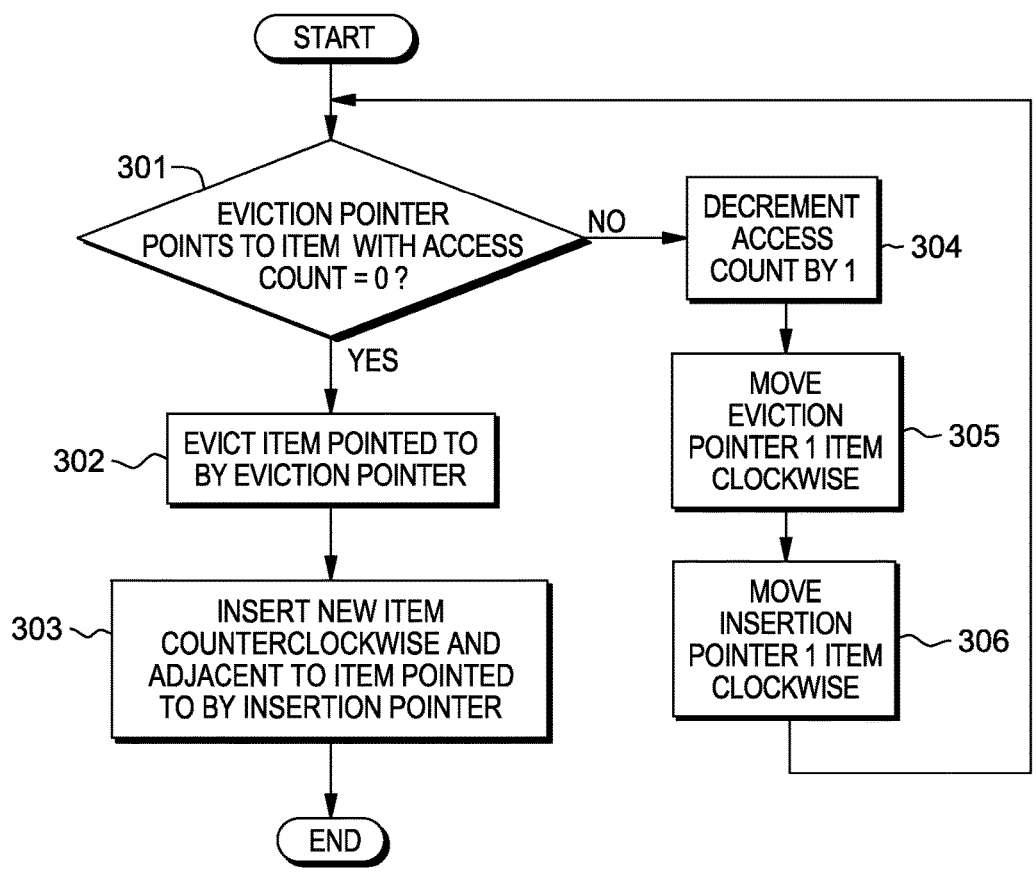
FIG. 3 depicts a flow chart that implements a replacement algorithm for a circular buffer depicted in FIG. 2, in accordance with an embodiment of the present invention.

A flow chart in FIG. 3 depicts an operation of replacement algorithm 108, if a new item is to be inserted into circular buffer 200 and circular buffer 200 is full. In step 301 an access count of an item pointed to by eviction pointer 208 is queried. If the access count is zero the item is evicted in step 302 and the new item is inserted counterclockwise and adjacent to the item pointed to by insertion pointer 209 in step 303. If the insertion count is not zero (step 301, no branch), the insertion count is decremented by one in step 304 and eviction pointer 208 moves one item clockwise in step 305 and insertion pointer 209 moves one item clockwise in step 306. Steps 301, 304, 305 and 306 are repeated until the eviction pointer points to an item with an access count of zero and then step 302 and step 303 are performed.

FIG. 4 shows a pseudo code for an exemplary embodiment of replacement algorithm 108 when an item called item X is accessed (referenced). Code 401 executes if item X is in circular buffer 200 and replacement algorithm 108 terminates execution when code 401 completes. Code 402 executes if item X is not in circular buffer 200 and circular buffer 200 is not full. Code 402 inserts item X counterclockwise and adjacent to the item pointed to by insertion pointer 209 and then terminates execution of replacement algorithm 108. Code 403 executes if item X is not in circular buffer 200 and circular buffer 200 is full. Code 404, a code within code 403, is a loop that moves eviction pointer 208 clockwise in circular buffer 200 in search of an item with an access count of zero and concurrently moves insertion pointer 209 to maintain a constant clockwise distance from insertion pointer 209 to eviction pointer 208. When code 404 finds an item with an access count of zero, code 405 executes, which evicts the item and inserts item X counterclockwise and adjacent to the item pointed to by insertion pointer 209. Replacement algorithm 108 terminates execution when code 405 completes execution.

Figure 5:
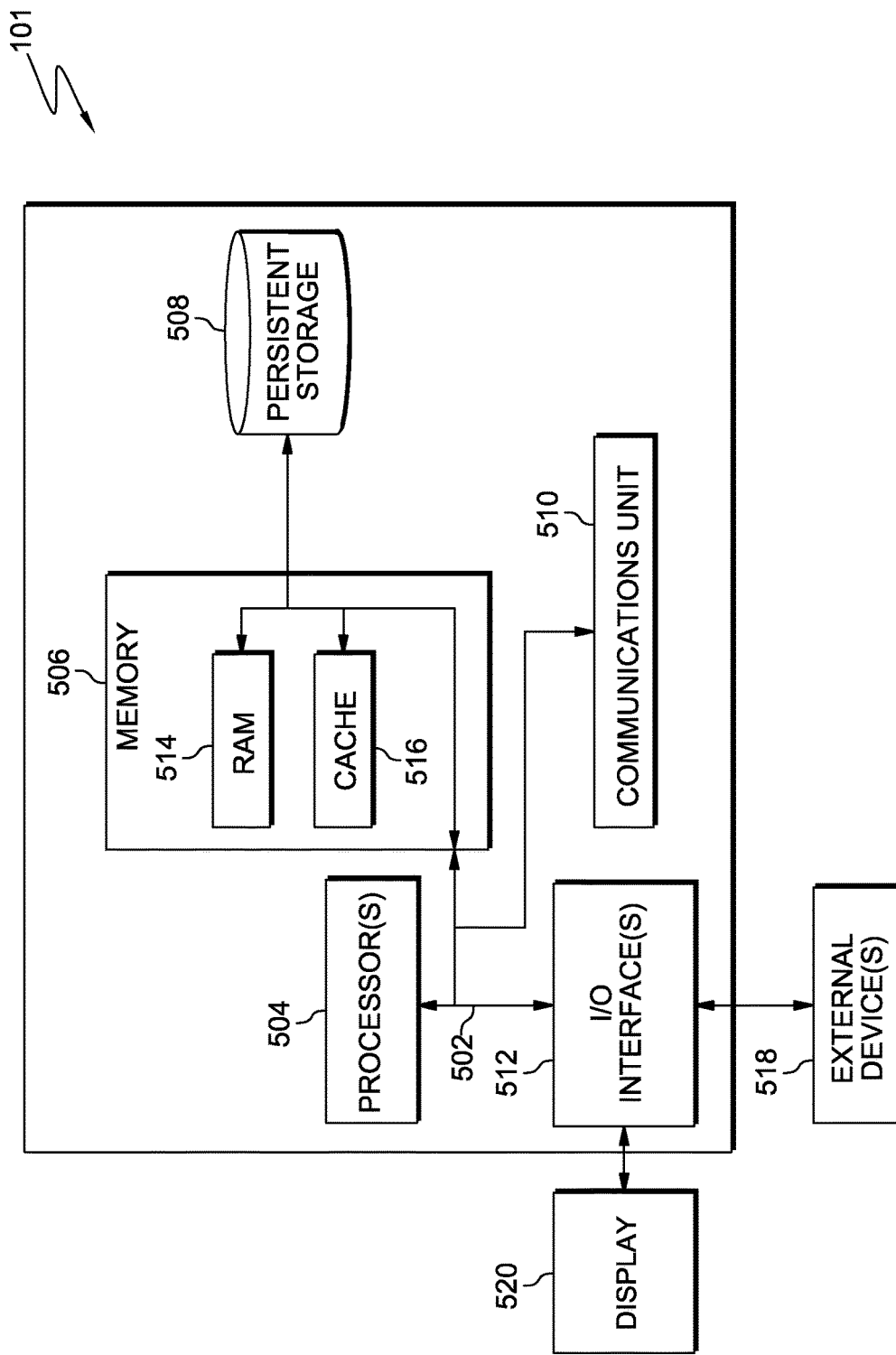
FIG. 5 depicts a block diagram of components of a computing device, in accordance with an embodiment of the present invention.

FIG. 5 depicts a block diagram of components of computer system 101 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 101 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Data intensive program 104 and two handed circular buffer system 102 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of computer system 101. In these examples, communications unit 510 includes one or more network interface cards.

Communications unit 510 may provide communications through the use of either or both physical and wireless communications links. Data intensive program 104 and two handed circular buffer system 102 may be downloaded to persistent storage 508 through communications unit 510.

I/O interface(s) 512 allows for input and output of data with other devices that may be connected to computer system 101. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., Data intensive program 104 and disk health monitor and two handed circular buffer system 102 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The forgoing description are example embodiments only, and those skilled in the art understand that a distance between an eviction pointer and an insertion pointer need not be a constant, that an access count may be incremented or decremented by any amount, that an item may be inserted any distance and in a clockwise or counterclockwise direction from an insertion pointer, and that an eviction pointer and an insertion pointer may move by any amount clockwise or counterclockwise.

What is claimed is:

1. A method for selecting an eviction location of an item to evict and an insertion location for a new item in a circular buffer, the method comprising the steps of:
   in a circular buffer:
      moving, by one or more processors, in the same direction both of i) an insertion pointer to a first buffer entry, and ii) an eviction pointer to a second buffer entry that includes a first item, such that a constant number of buffer entries is maintained between the eviction pointer and the insertion pointer; and
      responsive to an eviction of the first item from the second buffer entry, inserting, by the one or more processors, a new item into a third buffer entry that is located such that the third buffer entry is pointed to by the eviction pointer before being pointed to by the insertion pointer as the eviction pointer and the insertion pointer continue to move around the circular buffer.

2. The method of claim 1, wherein a location of the eviction pointer precedes a location of the insertion pointer relative to a direction of movement of the insertion pointer.

3. The method of claim 1, the method including:
   responsive to the eviction pointer being moved to the second buffer entry, decrementing, by the one or more processors, an access count of the first item by one if the access count is above zero; and
   responsive to a determination that the first item has an access count of zero when the eviction pointer moves to the second circular buffer entry, evicting, by the one or more processors, the first item.

4. The method of claim 1, wherein insertion of the new item into the third buffer entry includes replacing an existing item included in the third buffer entry with the new item.

5. The method of claim 1, the method including:
   determining, by the one or more processors, whether a threshold number of items exist in the circular buffer; and
   responsive to a determination that the threshold number of items exist in the circular buffer, by initiating, by the one or more processors, entrance of the circular buffer into an eviction mode that includes using the eviction pointer to evict items included in the circular buffer.

6. The method of claim 1, the method including:
   establishing, by the one or more processors, an independent access count limit for each new item when a new item is inserted in the circular buffer.

7. The method of claim 1, wherein the constant number of buffer entries between the eviction pointer and the insertion pointer is based, at least in part, on a hit ratio of the circular buffer.

8. The method of claim 1, the method including:
   incrementing, by the one or more processors, an access count of a given item in the circular buffer by one if the given item is accessed and the access count of the given item is less than an access count limit.

9. The method of claim 8, wherein an amount by which the access count of the first item is incremented is zero or greater and is determined based, at least in part, on at least one of i) a current value of the access count of the given item, ii) a characteristic of the given item, and iii) a hit ratio of the circular buffer.

10. A computer system for selecting an eviction location of an item to evict and an insertion location for a new item in a circular buffer, the computer system comprising:
    one or more computer processors;
    one or more computer readable storage device;
    program instructions stored on the computer readable storage device for execution by at least one of the one or more processors, the program instructions comprising:
       program instructions to move, in a circular buffer, in the same direction both of i) an insertion pointer to a first buffer entry, and ii) an eviction pointer to a second buffer entry that includes a first item, such that a constant number of buffer entries is maintained between the eviction pointer and the insertion pointer; and
       program instructions to respond to an eviction of the first item from the second buffer entry, by inserting, in the circular buffer, a new item into a third buffer entry that is located such that the third buffer entry is pointed to by the eviction pointer before being pointed to by the insertion pointer as the eviction pointer and the insertion pointer continue to move around the circular buffer.

11. The computer system of claim 10, wherein a location of the eviction pointer precedes a location of the insertion pointer relative to a direction of movement of the insertion pointer.

12. The computer system of claim 10, the program instructions including:
    program instructions to respond to the eviction pointer being moved to the second buffer entry, by decrementing, in the circular buffer, an access count of the first item by one if the access count is above zero; and program instructions to respond to a determination that the first item has an access count of zero when the eviction pointer moves to the second circular buffer entry, by evicting, in the circular buffer, the first item.

13. The computer system of claim 10, wherein insertion of the new item into the third buffer entry includes replacing an existing item included in the third buffer entry with the new item.

14. The computer system of claim 10, the program instructions including:
program instructions to determine whether a threshold number of items exist in the circular buffer; and
program instructions to respond to a determination that the threshold number of items exist in the circular buffer, by initiating entrance of the circular buffer into an eviction mode that includes using the eviction pointer to evict items included in the circular buffer.

15. The computer system of claim 10, the program instructions including:
program instructions to establish an independent access count limit for each new item when a new item is inserted in the circular buffer.

16. The computer system of claim 10, wherein the constant number of buffer entries between the eviction pointer and the insertion pointer is based, at least in part, on a hit ratio of the circular buffer.

17. The computer system of claim 10, the program instructions including:
program instructions to increment an access count of a given item in the circular buffer by one if the given item is accessed and the access count of the given item is less than an access count limit.

18. The computer system of claim 17, wherein an amount by which the access count of the first item is incremented is zero or greater and is determined based, at least in part, on at least one of i) a current value of the access count of the given item, ii) a characteristic of the given item, and iii) a hit ratio of the circular buffer.

19. A computer program product for selecting an eviction location of an item to evict and an insertion location for a new item in a circular buffer, the computer program product comprising:
one or more computer-readable storage device and program instructions stored on the one or more computer-readable storage media, the program instructions comprising:
program instructions to move, in a circular buffer, in the same direction both of i) an insertion pointer to a first buffer entry, and ii) an eviction pointer to a second buffer entry that includes a first item, such that a constant number of buffer entries is maintained between the eviction pointer and the insertion pointer; and
program instructions to respond to an eviction of the first item from the second buffer entry, by inserting, in the circular buffer, a new item into a third buffer entry that is located such that the third buffer entry is pointed to by the eviction pointer before being pointed to by the insertion pointer as the eviction pointer and the insertion pointer continue to move around the circular buffer.

20. The computer program product of claim 19, the program instructions including:
program instructions to respond to the eviction pointer being moved to the second buffer entry, by decrementing, in the circular buffer, an access count of the first item by one if the access count is above zero; and
program instructions to respond to a determination that the first item has an access count of zero when the eviction pointer moves to the second circular buffer entry, by evicting, in the circular buffer, the first item.

* * * * *